Figure 4:
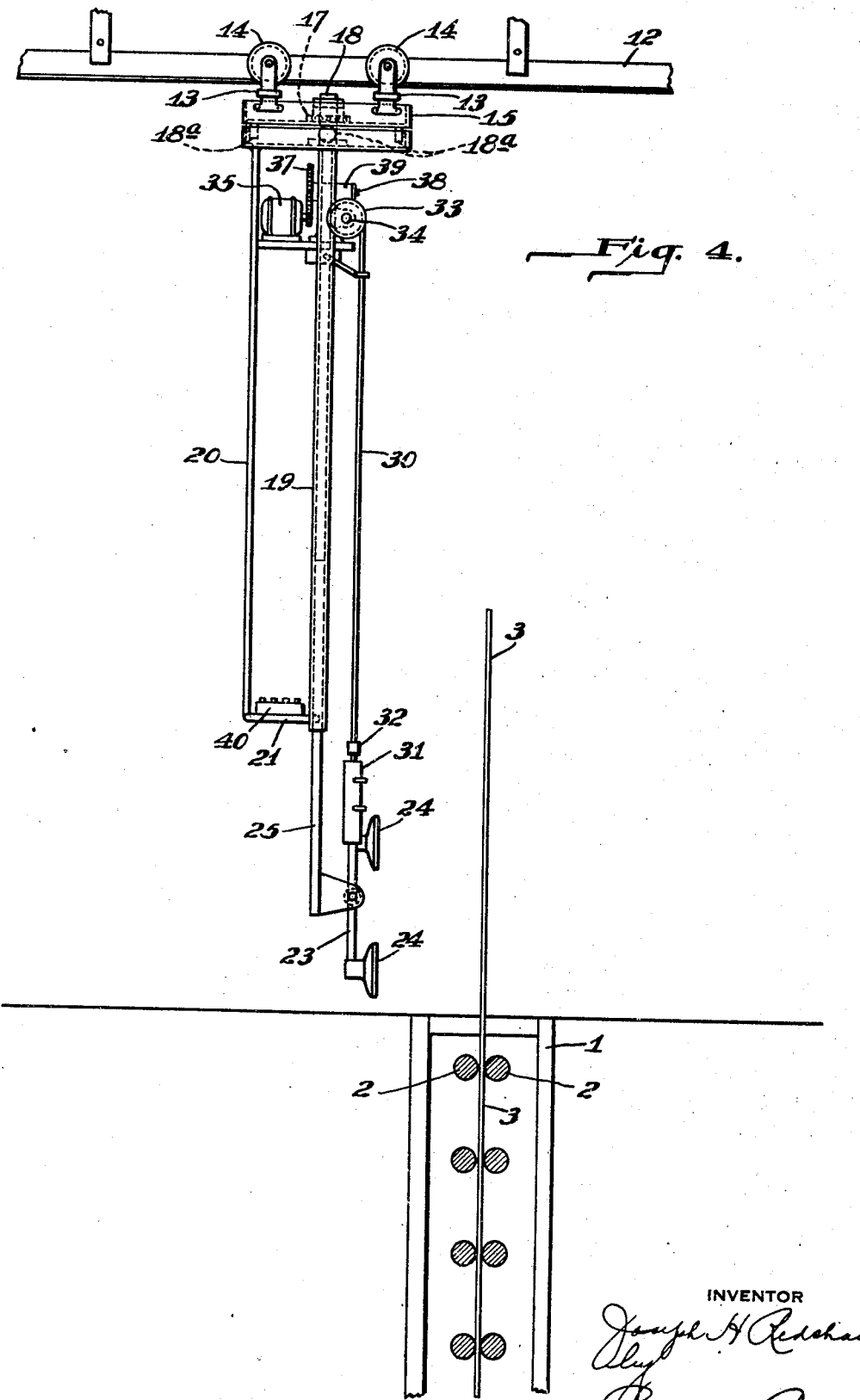

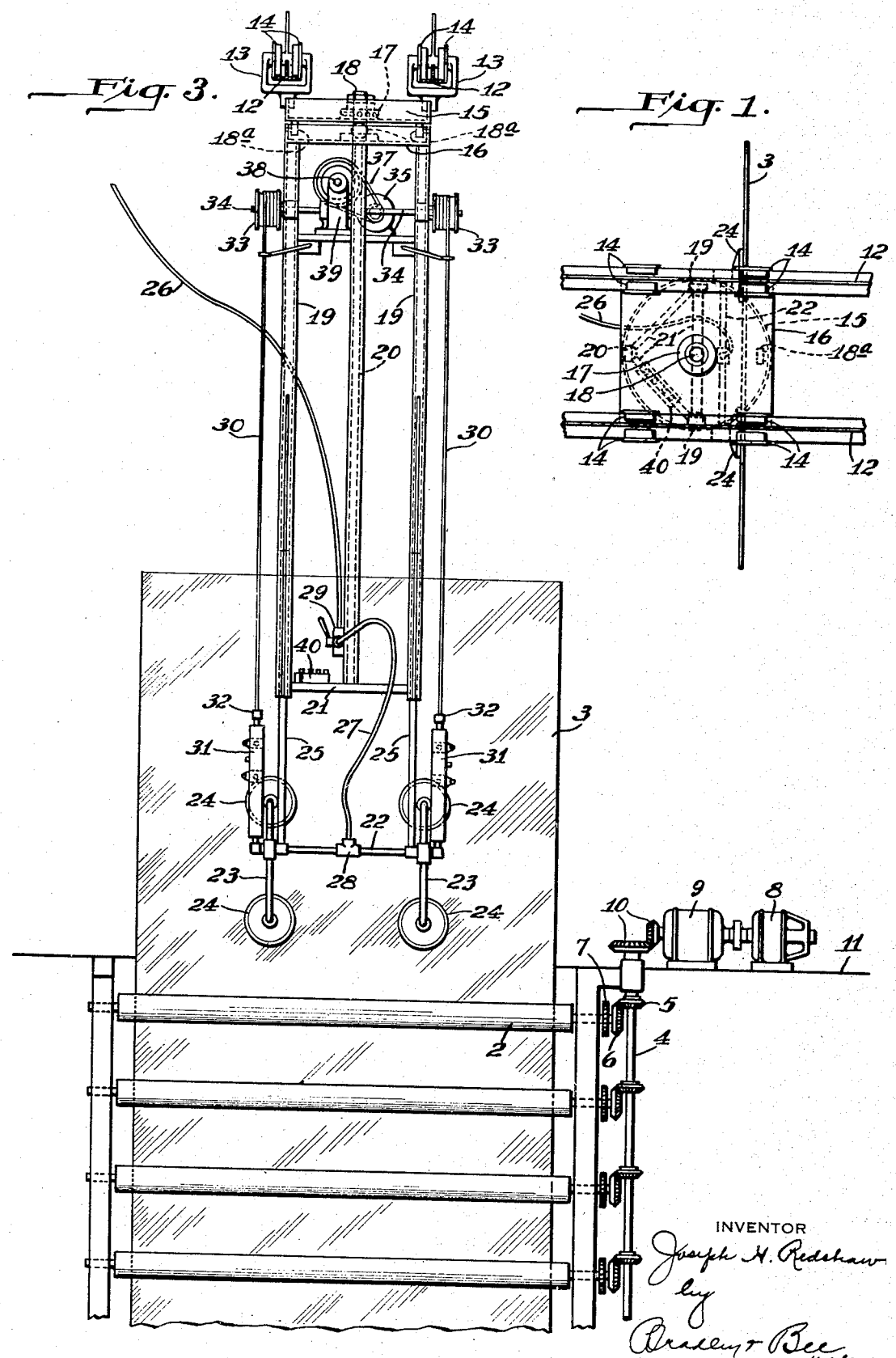

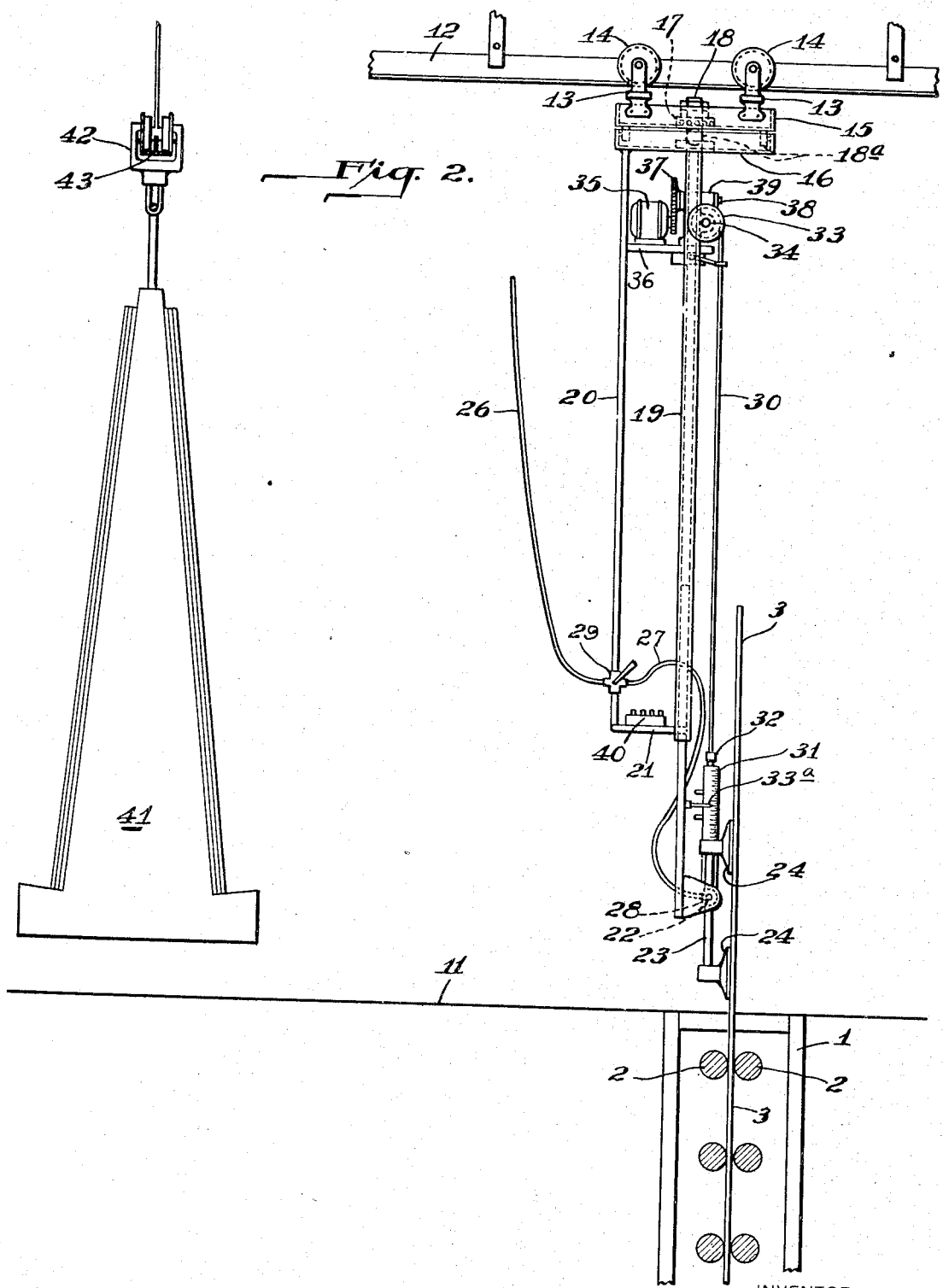

Patented Apr. 25, 1933

1,905,748

UNITED STATES PATENT OFFICE

JOSEPH H. REDSHAW, OF HOMESTEAD PARK, PENNSYLVANIA, ASSIGNOR TO PITTSBURGH PLATE GLASS COMPANY, A CORPORATION OF PENNSYLVANIA

GLASS DRAWING APPARATUS

Application filed March 12, 1932. Serial No. 598,437.

The invention relates to apparatus for drawing glass in a continuous sheet, and handling it after it is cut off. The invention is applicable in connection with vertical drawing systems, in which the sheet is carried vertically through a leer and cut off in suitable lengths just above the top of the leer. When the glass sheets are of great width and the sections to be cut off are relatively long, difficulty is experienced in handling the sheets by hand and such handling involves some danger when breakage occurs. Further, in the making of sections of large size, the danger of breaking the glass before or during the cutting off operation (due to the fact that the relatively large fragile sheet is unsupported above the upper pair of leer rolls) is a serious consideration. The objects of the present apparatus are to avoid the above hazards and difficulties in making the large size sheets as above described, so that the strain upon the sheet above the last pair of leer rolls is reduced and all danger incident to the handling of the sheet is avoided. A further object is to reduce the force required to be applied by the leer rolls in order to draw the glass and carry it through the leer to the point of cut off, thus reducing the slipping action of the leer rolls on the glass which tends to mar it. Certain embodiments of the invention are illustrated in the accompanying drawings, wherein:

Figure 1 is a plan view. Fig. 2 is a side elevation. Fig. 3 is a rear elevation. And Fig. 4 is another side elevation with the parts in position different from that of Fig. 2.

Referring to the drawings, 1 is the upper end of a vertical leer provided with the rollers 2 by means of which the sheet 3 is drawn up continuously from a bath of molten glass (not shown). The rolls are driven from a vertical line shaft 4 (Fig. 3) provided with bevel gears 5, meshing with gears 6 on one roll of each pair, the other rolls of each pair being driven by a spur gear 7 which meshes with a similar gear on the opposing roll. The line shaft is driven from a motor 8 through the intermediary of gearing in the casing 9 and the bevel gears 10. 11 is the floor above which the handling apparatus, to which the invention particularly relates, is located.

The handling apparatus includes a pair of rails 12 upon which a conveyor is mounted, such conveyor including four hangers 13 provided with the wheels 14 riding upon the rails and a flanged plate 15 to which the hangers are riveted. Swivelled upon the plate 15 is a second plate 16, such plate being supported from the roller bearing 17 by means of the shaft 18. The plate 16 is steadied from the plate 15 at its periphery by means of a plurality of rollers 18ᵃ journalled on the flange of the plate 16 and engaging the lower surface of the plate 15. This permits the framework carried by the plate 16 to be turned about a vertical axis for the purpose later described. Secured rigidly to the plate 16 is a depending framework comprising the three pipes 19, 19 and 20, such pipes being connected at the bottom by the struts 21, 21. A vacuum frame for engaging the glass is mounted for vertical movement upon the lower end of the framework 19, 19, 20, such vacuum frame comprising a transverse rod 22 and a pair of vertical bars 23 which bars 23 are secured intermediate their ends to the bar 22. Each bar 23 carries at its end a pair of vacuum cups 24, 24 adapted to grip the glass sheet and support it when air is exhausted from the cups, this being a glass handling device well known in the art. The vacuum frame is guided upon the frame 19, 19, 20 by means of a pair of vertical pipes 25, 25 which telescope into the pipes 19, 19. The vacuum cups are connected to the flexible vacuum pipe 26 by means of the pipe 27 which makes connection at 28 with the transverse rod 22 which is hollow and communicates with the bars 23, 23 which are also hollow, the last mentioned bars making connection with the interior of the vacuum cups. A valve 29 controls the application and release of vacuum through the pipe 27.

The vacuum frame is raised and lowered by means of a pair of cables 30, 30 connected to the ends of the transverse bar 22 through the intermediary of the pair of spring scale devices 31. These spring scale devices comprise casings pivoted to the ends of the bar 22 with a plunger therein whose upper end is connected with the cables at 32. Intermediate the end of the plunger which rides in the casing and the upper end of the casing are springs whose compression is indicated by pointer 33 moving over a scale on the outer side of the casing. The purpose of the spring scale device is to give an indication of the lifting force applied to the vacuum frame by means of the cables for the purpose later described. The cables at their upper ends pass around drums 33 mounted on a shaft 34 and this shaft is rotated from a motor 35 carried on a platform 36 near the upper end of the framework 19, 19, 20. The motor drives the shaft 34 through the intermediary of the chain drive 37 passing around sprockets on the end of the motor shaft and on the end of the countershaft 38 and worm wheel reducing gearing in the casing 39. The operation of the motor is controlled from the push button switch 40 located on one of the struts 21 at the lower end of the framework 19, 19, 20.

In operation, the vacuum cups are caused to engage the upper end of the sheet 3 when it emerges sufficiently above the floor 11 and the motor 35 is started so that the operation of the cables 30 applies lifting force to the vacuum frame so that such frame assists in drawing the glass sheet. This lifting force is in excess of the weight of the sheet section which is to be cut off of the upper end of the continuous sheet 3. This assistance by the vacuum frame in the drawing of the sheet is of advantage as it assists in preventing the drawing rolls 2 from slipping over the surface of the glass sheet. The slippage of the rolls on the glass sheet involves a certain amount of marring of the sheet. The scale devices 31 indicate the pull which is imposed upon the cables 30 by the motor and this pull can be regulated by means of a rheostat which controls the speed of the motor. The speed of the motor 35 is such that when the upper section of the glass sheet is severed from the main sheet 3, the vacuum frame will move the severed section away from the end of the sheet 3 so that there is no interference in moving the severed sheet laterally. For example, if the speed of draw of the sheet effected by the motor 8 is 36 inches per minute, the motor 35 will be regulated to move the severed sheet upward at a speed of about 40 inches per minute. The conveyor on the tracks 12, 12 may now be moved laterally to carry the sheet to any desired point. In one system of operation, it is carried into opposition with the face of a tilting cutting table to which the sheet is transferred by the vacuum frame, after which the cutting table is moved to horizontal position and the edges of the sheet trimmed off. Subsequently, the cutting table is tilted back to a position approximating a vertical position, the sheet is engaged by the vacuum frame and is carried to the rack 41 (Fig. 2). This rack is mounted upon a conveyor 42 on the rail 43 and after the rack is loaded, it is removed to the cutting room. The arrangement of the vacuum frame so that it tilts with the shaft 22 as an axis greatly facilitates the transfer of the glass sheet to the inclined cutting table as well as its removal from such table and its transfer to the rack 41. These transfer operations are also facilitated by the swivelling of the frame 19, 19, 20 so that such frame may be swung around the shaft 18 as a vertical axis. The frame 19, 19, 20 is readily moved along the rails 12 from point to point by the operator who grasps the vertical frame member 20, as a handle and is also easily rotated about the swivel 18 in the same way. The use of the device makes it possible to handle larger sheet sections than would otherwise be possible by hand and makes such handling safe and easy in all cases. While one sheet is being removed and placed upon the rack, the next sheet advances to a point where it can be engaged by the vacuum frame which is by this time free for such operation.

While an electric motor constitutes the preferred means for applying a lifting force to the vacuum frame, it will be understood that any other suitable power means may be employed and the terms "motor" is used in its broad sense to mean any prime mover.

What I claim is:

1. In combination with apparatus for drawing a glass sheet and carrying it vertically through a leer, a supporting means above the leer for engaging the glass sheet, a motor for applying a lifting force to said supporting means preliminary to cutting off the top section of the sheet which is engaged by the lifting means, and a conveyor mounted for lateral movement on which said supporting means is carried.

2. In combination with apparatus for drawing a glass sheet and carrying it vertically through a leer, a conveyor mounted for lateral movement above the leer, a tilting vacuum frame supported upon the conveyor and adapted to engage the top section of the sheet as it emerges from the leer, and a motor on the conveyor for applying a lifting force to the vacuum frame preliminary to cutting off said top section, such force being in excess of that required to lift said top section.

3. In combination with apparatus for drawing a glass sheet and carrying it vertically through a leer, a conveyor mounted for lateral movement above the leer, a tilting vacuum frame supported upon the conveyor and adapted to engage the top section of the sheet as it emerges from the leer, and an electric motor on the conveyor arranged to apply a lifting force to the vacuum frame preliminary to cutting off said top section, said lifting force being in excess of that required to move the top section upward at a rate of speed in excess of the speed applied to the sheet by the drawing apparatus.

4. In combination with apparatus for drawing a glass sheet and carrying it vertically through a leer, a conveyor mounted for lateral movement above the leer, a tilting vacuum frame swivelled for movement about a vertical axis on the conveyor and adapted to engage the top section of the sheet as it emerges from the leer, and power means on the conveyor for applying a lifting force to the vacuum frame prelimary to cutting off such top section, such force being in excess of that required to lift the top section at a rate of speed in excess of the speed of draw of the glass sheet.

In testimony whereof, I have hereunto subscribed my name this 1st day of March, 1932.

JOSEPH H. REDSHAW.